Patented Apr. 22, 1947

2,419,290

UNITED STATES PATENT OFFICE 2,419,290

CERAMIC MATERIAL

Carl Frederic Schaefer, Flint, Mich., assignor to General Motors Corporation, Detroit, Mich., a corporation of Delaware No Drawing. Application May 13, 1943, Serial No. 486,852

11 Claims. (Cl. 106—46)

This invention has to do with ceramic material especially adapted for use as insulators for spark plugs for internal combustion engines.

The best spark plugs available today have aluminum oxide as the base material, the remainder usually consisting of silica or silicates, together with small amounts of fluxes or other addition agents. The end product usually consists of crystals sintered together with the interstices filled with glass.

A practical difficulty encountered in the manufacture of such bodies arises from the high firing temperatures required, for example temperatures on the order of from 1650° to 1750° C. To reach such temperatures it is necessary to make use of special fuels and specially constructed kilns made of the most heat resistant refractories. The life of such refractories is short so that the kiln maintenance expense is high. The difficulty of controlling firing conditions to insure a satisfactory finished product is correspondingly increased.

I have discovered that insulators having physical properties approaching those of existing aluminum oxide base bodies may be produced from compositions having firing temperatures much lower than those now required; for example, as low as Orton cone 16, approximately 1450° C.

The improved bodies are characterized by the use of alkaline earth phosphate, particularly calcium phosphate, in alumina base bodies containing clay, preferably in plastic form to permit shaping by plastic methods. The raw materials may be varied as follows:

Alumina

The alumina is preferably high temperature calcined alumina known as tabular corundum, although other forms such as fused alumina may be employed if desired. In some instances it may be desirable to use a percentage of low temperature calcined alumina. It is not essential that the alumina be free from alkalies so that the form Beta may be used, the percentage being varied to give the physical characteristics required.

Some of the alumina may be introduced in the form of aluminum silicates higher in alumina than clay, such, for example, as kyanite.

Alkaline earth phosphate

Successful bodies have been produced using either calcium, magnesium, barium or strontium phosphates. Of these, calcium phosphate is the most desirable because smaller quantities are required and the material is inexpensive and readily available. Bone ash, a mixture of calcium phosphate and calcium carbonate, may be used but difficulty is likely to be encountered owing to variability in composition. It may at times prove desirable to use a mixture of the phosphates mention.

Clay

The best results have been obtained by the use of kaolin or ball clay so as to permit processing by plastic methods as hereinafter described. Particularly good results have been obtained by using a mixture of English ball clay and Florida kaolin. Some or all of the clay may be of the montmorillonite variety, for example bentonite. If desired, the clay may be replaced by equivalent amounts of alumina and silica, this necessitating the use of non-plastic methods of forming.

Additional materials

In some cases it may be desirable to add a small proportion of zircon or zirconium oxide to the body, but greater mechanical strength is obtained when it is omitted. Talc or other suitable flux may be employed if it is desired to further lower the firing temperature but the difficulties of firing at cone 16 are not great so that little advantage would be obtained from doing so.

Proportions of ingredients

The following is the preferred range of ingredients of the body batch:

| | Per cent |
|---|---|
| Alumina | 62–84 |
| Clay | 12–30 |
| Calcium phosphate | 4–8 |

The above corresponds to the following range of oxide contents:

| | Per cent |
|---|---|
| Alumina | 73.85–88.74 |
| Silica | 5.58–13.95 |
| Calcium oxide | 2.17–4.34 |
| $P_2O_5$ | 1.83–3.66 |

The following is the composition of one of the most desirable bodies so far developed.

| | Per cent |
|---|---|
| English ball clay | 15 |
| Florida kaolin | 5 |
| Calcium phosphate | 5 |
| Tabular corundum | 75 |

Preparation of body

The preferred method of forming the preferred body is as follows:

The tabular corundum is ground to pass a 325 mesh screen and magnetic particles are separated from it. The materials in the above proportions are then ground with water in a ball mill to form a slip and after further screening and separating, filter cake is made from the slip and is fed to a suitable mixer, such as the well-known Lancaster or Simpson mixers. Water is preferably added during the mixing to bring the moisture content to the desired amount. The resulting plastic mass is then shredded and fed into a vacuum pug mill from which it is extruded in the form of cylindrical blanks. Thereafter the blanks are partially dried and thereafter pierced to form the bore for the electrode and, after somewhat further drying to a leather hard condition, are turned to insulator shape. Thereafter the insulators are thoroughly dried and fired in suitable tunnel kilns at approximately cone 16 to produce a dense, non-porous body. This process may be somewhat varied by first drying the blanks to bone-dry state, and thereafter grinding them to final shape.

The bodies may, if preferred, be made by other methods, such as casting from slip; or pressing in rubber molds as described and claimed in Fessler and Russell Patent 2,091,973, granted September 7, 1937; or by mixing with a binder and forming by pressing or extruding and thereafter burning out the binder as described and claimed in Schwartzwalder Patent 2,122,960, granted July 5, 1938. When the last mentioned method is employed the clay is first calcined and the materials are thereafter finely ground and thoroughly mixed with the binder prior to forming.

The bodies herein disclosed possess the advantage of long firing range which facilitates manufacture.

Firing temperatures on the order of cone 16 (approximately 1450° C.) will normally be sufficient to mature the bodies. If more than 5% calcium phosphate is used cone 14—approximately 1400° C.—will be sufficient.

The improved bodies possess physical characteristics far superior to those of conventional porcelains and approaching the qualities of sintered bodies fired at much higher temperatures, that is, on the order of 1750° C. Thus the preferred form of body has a modulus of rupture of approximately 31,964 pounds per square inch compared with 36,854 pounds per square inch for the high temperature sintered bodies, and 17,248 pounds per square inch for a representative porcelain body fired at cone 16. The Te value (electrical resistance at high temperatures) of the new body is 693° C. compared with 725° C. for the high temperature alumina base body, and 640° C. for the porcelain body. The thermal expansion in the range 200° to 600° C. of the new body is $6.93 \times 10^{-6}$ compared with $7.76 \times 10^{-6}$ for the high fired alumina base body and $4.21 \times 10^{-6}$ for the porcelain body. The new body can be fired in kilns used in the manufacture of conventional porcelain bodies.

The use of alkaline earth phosphates as a flux in compositions where the refractory ingredient may be other than aluminum oxide is indicated.

I claim:

1. Ceramic material made by firing to a dense, non-porous body alumina base ceramic material containing at least 12% clay to impart plasticity to the mass and a small proportion of alkaline earth phosphate, the proportion of aluminum oxide introduced as such or in combined form being at least approximately 73%, said alumina base ceramic material being free of manganese oxides and alkaline earth borates.

2. Ceramic material made by firing to a dense, non-porous body an intimate mixture consisting predominantly of aluminum oxide, clay and a small proportion of calcium phosphate, the proportion of aluminum oxide introduced as such or in combined form being at least approximately 73%, said mixture being free of manganese oxides and alkaline earth borates.

3. An insulator for spark plugs and the like made by forming to the desired shape and firing to a dense, non-porous body an intimately ground mixture showing upon chemical analysis approximately from 73 to 89% alumina, from 5 to 14% silica, from 2 to 4.5% alkaline earth oxide, and from 1.8 to 3.7% phosphoric oxide.

4. An insulator for spark plugs and the like made by forming to the desired shape and firing to a dense, non-porous body a finely ground mixture of approximately from 73 to 89% alumina, from 5 to 14% silica, from 2 to 4.5% calcium oxide, and from 1.8 to 3.7% phosphoric oxide.

5. An insulator for spark plugs and the like made by forming to the desired shape and firing to a dense, non-porous body a finely ground mixture of approximately from 62 to 84% alumina, from 12 to 30% clay and from 4 to 8% alkaline earth phosphate.

6. An insulator for spark plugs and the like made by forming to the desired shape and firing to a dense, non-porous body a finely ground mixture of approximately from 62 to 84% alumina, from 12 to 30% clay and from 4 to 8% calcium phosphate.

7. Ceramic material made by forming to the desired shape and firing to a dense, non-porous body a finely ground mixture of approximately from 62 to 84% tabular corundum, from 12 to 30% clay and from 4 to 8% alkaline earth phosphate.

8. Ceramic material made by firing to a dense, non-porous condition an intimately ground mixture showing upon chemical analysis approximately from 73 to 89% alumina, from 5 to 14% silica, from 2 to 4.5% alkaline earth oxide and from 1.8 to 3.7% phosphoric oxide.

9. An insulator for spark plugs and the like made by forming to the desired shape and firing to temperatures on the order of 1450° C. or less to form a dense, non-porous body, an intimately ground mixture showing upon chemical analysis approximately from 73 to 89% alumina, from 5 to 14% silica, from 2 to 4.5% alkaline earth oxide, and from 1.8 to 3.7% phosphoric oxide.

10. A dense, non-porous ceramic material adapted for use as a spark plug insulator, consisting of the heat reaction product of a mixture showing upon chemical analysis the following oxides as its only essential ingredients; alumina, silica, alkaline earth oxide and phosphoric acid, the alumina content being at least approximately 73%, a sufficient proportion of the alumina and silica being introduced in the form of plastic clay to impart plasticity to the body, the alkaline earth oxide and the phosphoric acid being introduced in the form of alkaline earth phosphate and being in an amount sufficient to substantially reduce the firing temperature of the body.

11. A dense, non-porous ceramic material adapted for use as a spark plug insulator, consisting of the heat reaction product of a mixture showing upon chemical analysis the following oxides as its only essential ingredients; alumina, silica, calcia and $P_2O_5$, the alumina content being at least approximately 73%, a sufficient proportion of the alumina and silica being introduced in the form of plastic clay to impart plasticity to the body, the calcium oxide and the phosphoric acid being introduced in the form of calcium phosphate and being in an amount sufficient to substantially reduce the firing temperature of the body.

CARL F. SCHAEFER.

REFERENCES CITED

The following references are of record in the file of this patent:

UNITED STATES PATENTS

| Number | Name | Date |
|---|---|---|
| 1,828,211 | Wolfsholz | Oct. 20, 1931 |
| 2,290,107 | Luks | July 14, 1942 |
| 2,207,558 | Singer | July 9, 1940 |
| 1,788,123 | Phelps et al. | Jan. 6, 1931 |

FOREIGN PATENTS

| Number | Country | Date |
|---|---|---|
| 462,781 | British | 1937 |
| 127,605 | Austrian | 1932 |
| 445,722 | German | 1927 |
| 5,191 | British | 1889 |
| 480,982 | British | 1938 |